United States Patent Office 3,265,448
Patented August 9, 1966

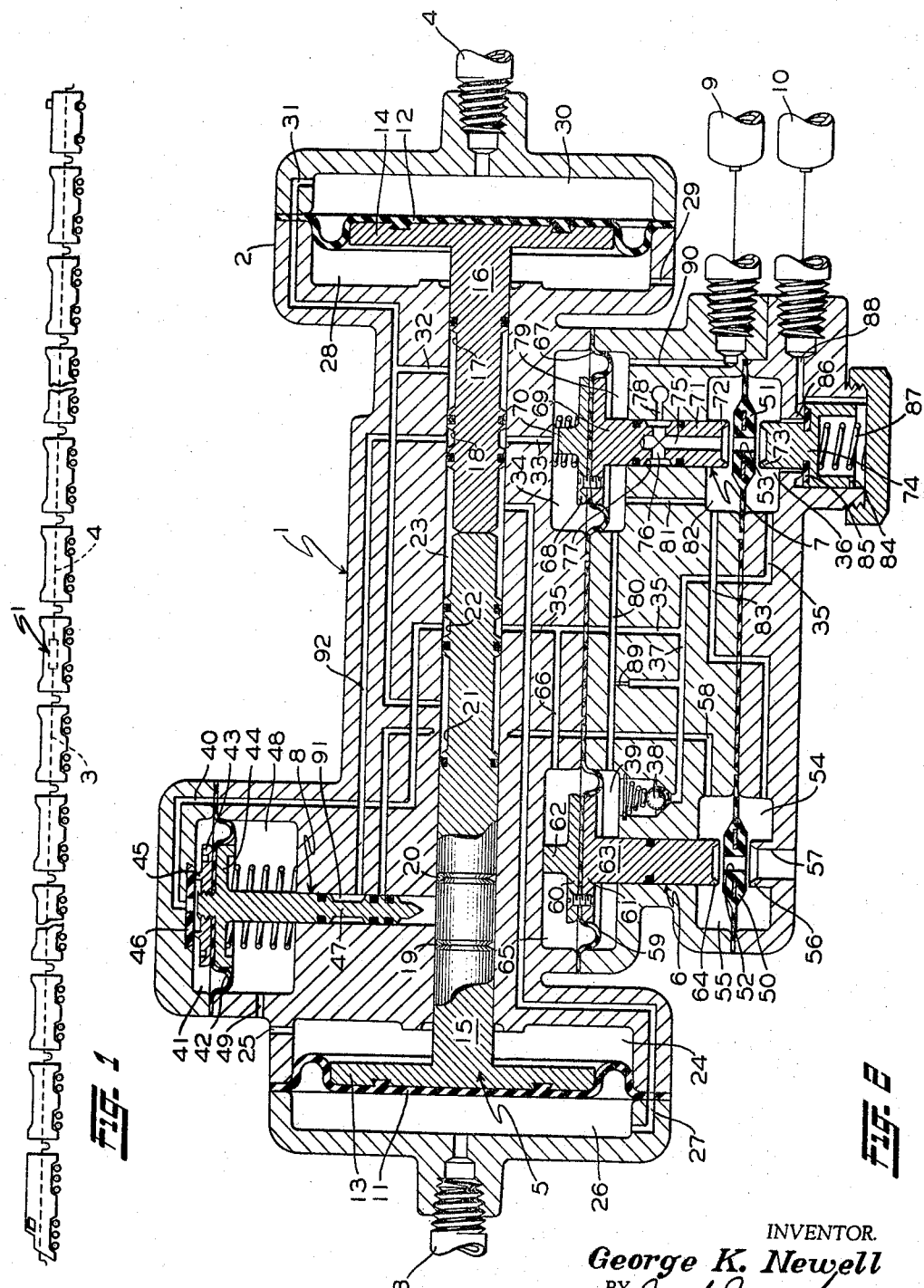

3,265,448
FLUID PRESSURE BRAKE CONTROL APPARATUS
George K. Newell, Level Green, Penn Township, Westmoreland County, Pa., assignor to Westinghouse Air Brake Company, Wilmerding, Pa., a corporation of Pennsylvania
Continuation of application Ser. No. 311,405, Sept. 25, 1963. This application Feb. 18, 1965, Ser. No. 437,620
22 Claims. (Cl. 303—86)

This application is a continuation of copending application Serial No. 311,405, filed September 25, 1963, now abandoned.

This invention relates to a fluid pressure brake control apparatus for railway trains, and, more particularly, to a special relay valve device to be provided on an air supply car located in the middle of the train for providing a fluid pressure control of the brake pipe pressure on that portion of the train to the rear of the relay valve device as well as to propagate variation in control of brake pipe pressure from a forward portion of the train to the rearward portion of the train and vice versa.

The length of a train is limited to an extent by the ability of the engineer at the head end of the train to charge the brake equipment through the brake pipe throughout the train and his ability to effect an application of all the brakes in the train. This limit to the train length is due to the fact that the supply of pressurized fluid to the brake pipe and to the brake equipment on all the cars of the train must come from the lead locomotive of the train.

The difference is pounds per square inch between brake pipe pressure on the locomotive and the maximum obtainable on the rear of the train is referred to as gradient. Brake pipe gradient is a direct result of brake pipe leakage due to the large number of fittings and hose connections. In addition, brake pipe friction incurred by the flow of pressurized fluid from a single source at the locomotive through the train increases the gradient. The gradient encountered on exceptionally long trains is such as to make it difficult to provide a uniform brake application on both the forward portion as well as the rearward portion of the train. When uniformity of braking application is not possible due to gradient, the train length is shortened until the over-all brake pipe length permits effective control of the brakes.

It is an object of this invention to provide a double-acting relay valve device which is located on a special utility car at or near the middle of a long freight train to improve the response of the fluid pressure brake apparatus of the rearward portion of the train in accordance with the controlled variations in the fluid pressure on the forward portion of the train. In addition, the double-acting relay valve device functions to control the fluid pressure brake apparatus on the forward portion of the train in accordance with the variations in the fluid pressure on the rearward portion of the train as when the reduction in fluid pressure is initiated from a caboose. This reduces the over-all pressure gradient and brake pipe friction for the train thereby improving the response of brake control valve devices on the cars to brake pipe pressure variations and facilitating the lengthening of the train. During exceedingly cold weather conditions, leakage is an acute problem and trains must be shortened, however, with the addition of the double-acting relay valve device, normal length of trains in cold weather is possible.

The invention comprises a double-acting relay valve device located on an intermediate car of a train between forward and rearward sections of a brake pipe, adapted to have either one of the sections of the brake pipe operatively connected to the locomotive of a train, with the other section of the brake pipe operatively connected to the caboose. The double-acting relay valve device has a pilot valve operable between a first and second position, which pilot valve is latched in either of these positions upon pressurization of the one section of the brake pipe. Upon movement of the pilot valve to one of its two positions and initial pressurization of the one section of the brake pipe, a control valve means is actuated thereby to connect a fluid pressure reservoir to a first passageway and to connect the reservoir to the latch means to move such latch means into latching engagement with the pilot valve. The control valve means has a pressure control chamber and a balancing chamber. With the pilot valve in the first position, the pressure control chamber is connected to the one section of the brake pipe, and with the pilot valve in the second position, the pressure control chamber is connected to the other section of the brake pipe. The first passageway is connected to the other section of the brake pipe with the pilot valve in the first position, and, in addition, is connected via throttle valve means to the balancing chamber such that the pressure of such balancing chamber overcomes the pressure of the control chamber to move the control valve means to a position in which it closes off communication between the fluid pressure reservoir and the first passageway. Prior to such movement of the control valve means, the other section of the brake pipe is charged to substantially the same pressure as the one section of the brake pipe. The control valve means, with the pilot valve in the first position, is responsive to a predetermined reduction in pressure in the one section of the brake pipe to effect a corresponding reduction of pressure in the other section of the brake pipe. The control valve means, with the pilot valve in the first position, is responsive to leakage in the other section of the brake pipe followed by reduction in pressure in the balancing chamber to effect a recharging of the brake pipe pressure in the balancing chamber as well as in the other section of the brake pipe. The control valve means, with the pilot valve in the second position, is responsive to predetermined reduction in pressure in the other section of the brake pipe to effect a corresponding reduction in the one section of the brake pipe. The brake pipe control device has a second control valve means which cooperates with the pilot valve in the first position to register a brake pipe reduction in the other section of the brake pipe to effect a corresponding reduction of brake pipe pressure in the one section of the brake pipe.

Other objects and advantages of the invention will become more apparent in the following more detailed description of the invention.

In the accompanying drawing there is shown for purposes of illustration one form which the invention may assume in practice.

FIG. 1 is a schematic view of a long train showing the double-acting relay valve device on a car at or near the middle of a train and connected to the forward and rearward sections of the brake pipe.

FIG. 2 is a diagrammatic sectional view of a double-acting relay valve constructed in accordance with the principles of this invention.

The double-acting relay valve device 1, shown in FIGS. 1 and 2, is installed on a special utility car to be located approximately in the middle of a long train to assist the engineer in charging and reducing the pressure in the brake pipe on the rear portion of the train for releasing and applying the brakes to the rear of the train as is to be described. Relay valve device 1 comprises a sectionalized casing 2 operatively connected to the forward and rear sections 3 and 4 of the brake pipe and housing a pilot valve 5, piston type control valve 6, piston type control valve 7, latch means 8, timing reservoir 9 and a fluid pressure reservoir 10. As shown in FIG. 1, the forward section 3 of the brake pipe is connected to the locomotive of the train, while the rear section 4 of the brake pipe is connected to the caboose of the train.

The fluid pressure reservoir 10 is supplied with compressed air as by a gasoline-engine-driven compressor. Suitable pressure governor means (not shown) which reflects the pressure in the reservoir 10 is provided for starting and stopping the compressor so as to insure the maintenance of a supply of pressurized air adequate for normal braking needs on the rearward half of the train. It is to be assumed that the usual air compressor and main supply reservoir are available on the locomotive at the head end of the train to insure adequate pressurized air for the braking needs of the front half of the train.

The pilot valve 5 comprises a pair of spaced diaphragms 11 and 12 having their respective outer peripheral edges clamped between portions of the sectionalized casing 2. The respective inner surfaces of the spaced diaphragms 11 and 12 are connected to followers 13 and 14, respectively, which followers 13 and 14 are connected through abutting stem portions 15 and 16, respectively. Stem portion 16 has a pair of grooves 17 and 18 and a reduced end portion while stem portion 15 has a pair of spaced V notches 19 and 20, a pair of spaced grooves 21 and 22 and a reduced end portion. The respective reduced end portions of stems 15 and 16 cooperate with the bore of the sectionalized casing 2 which receives such stem portions 15 and 16 to define a chamber 23.

Diaphragm 11 is subject on one side to the pressure in chamber 24 vented to atmosphere via vent opening 25, and subject on the other side to the pressure in pressure control chamber 26. Pressure control chamber 26 is connected to the brake pipe section 3 and to a passageway 27, which passageway 27 is connected to the chamber 23. Diaphragm 12 is subject on one side to the pressure in chamber 28 which is connected to atmosphere via vent opening 29, and subject on the other side to the pressure in pressure chamber 30 which is connected to the brake pipe section 4 and to a passageway 31. The passageway 31 is connected to annular groove 21 on stem portion 15 and via branch passageway 32 to annular groove 17 on stem portion 16. Pressurization of control chamber 26 via brake pipe section 3 moves diaphragm 11 and the respective stem portions 15 and 16 rightward, as viewed in FIG. 1, to interconnect passageway 27 via chamber 23 with a passageway 33 and a chamber 34. The rightward movement of stems 15 and 16 also interconnects passageway 31 with a passageway 35 via annular groove 21, which passageway 35 is connected to a chamber 36. Passageway 35 also communicates via a branch passageway 37 and past a spring biased check valve 38 with a balancing chamber 39 for a purpose to be described. Passageway 35 is connected to a diametrically opposed passageway 40, which passageway 40 is connected to a chamber 41 of a latching device 8. Pressurization of pressure control chamber 30 via brake pipe section 4 prior to the pressurization of chamber 26 moves diaphragm 12 and the respective stem portions 15 and 16 leftward, as viewed in FIG. 1, to interconnect the passageway 31 from the pressure control chamber 30 via branch passageway 32 to the chamber 34. In addition, such leftward movement of the stem portions 15 and 16 interconnects pressure control chamber 26 via passageway 27 with passageway 35 and control chamber 36.

Latch means 8 has a diaphragm 42 which has its outer peripheral edge clamped between portions of the sectionalized casing 2 and its inner annular surface clamped between an upper follower disc 43 and a lower follower disc 44. Upper follower disc 43 has an annular sealing bead 45 normally seated on a valve seat 46 to close off communication between passageway 40 and pressure chamber 41. Lower follower disc 44 has a downwardly extending valve stem 47, which valve stem 47 has the reduced end portion adapted to engage either notch 19 or 20 for securely latching the stems 15 and 16 in their registered positions upon selective pressurization of either pressure chamber 26 or 30 and pressurization of pressure chamber 41 in a manner to be described. Diaphragm 42 and lower follower disc 44 cooperate with the sectionalized casing 2 to define a pressure chamber 48, which pressure chamber 48 is subject to atmospheric pressure via vent opening 49. Chamber 48 houses a helical spring which encompasses the valve stem 47. The spring has the lower end seated on the lowermost end portion of the sectionalized casing cooperating with chamber 48, and the upper end portion seated on the follower disc 44 biasing such follower disc 44 and diaphragm 42 upwardly until sealing bead 45 on upper follower disc 43 abuttingly engages valve seat 46.

The lower end portion of sectionalized casing 2 has a pair of spaced diaphragms 50 and 51 having central apertures 52 and 53, respectively. Aperture 52 of diaphragm 50 interconnects a lower chamber 54 with an upper chamber 55. Chamber 54 is normally vented to atmosphere past an annular sealing bead 56 via vent opening 57. Upper chamber 55 is connected via a passageway 58 to the bore containing valve stem 47 of latch means 8. In the normal unlatched position of latch means 8, as shown in FIG. 2, passageway 58 is blocked from communicating with any other passageway in the sectionalized casing.

Piston control valve 6 located closely adjacent diaphragm 50 comprises a flat circular diaphragm 59 having its outer edges suitably clamped between portions of the sectionalized casing 2 and its inner surface portions suitably clamped between an upper follower disc 60 and a lower follower disc 61. Upper follower disc 60 has an upwardly extending stem portion 62 which is adapted to engage the upper end portion of the casing bore within which such piston control valve 6 operates to limit the upward movement thereof. Lower follower disc 61 has a downwardly extending stem 63, which stem 63 has an annular sealing bead 64 on its lower end portion which is adapted to engage diaphragm 50. On downward movement of stem 63, stem 63 contacts diaphragm 50 and moves diaphragm 50 downwardly until the diaphragm 50 seats on the annular sealing bead 56 such that communication is blocked between chambers 54 and 55, as well as between chamber 54 and the atmosphere. Diaphragm 59 and follower discs 60 and 61 are subject on one side to the pressure in chamber 65 which is connected via passageway 66 to passageway 35 previously described, and subject on the other side to the pressure in balancing chamber 39.

Piston control valve 7 located closely adjacent diaphragm 51 comprises a flat circular diaphragm 67 having its outer edges suitably clamped between portions of the sectionalized casing 2 and its inner surface portions suitably clamped betwen an upper follower disc 68 and a lower follower disc 69. Upper follower disc 68 has an upwardly extending stem portion 70 which is adapted to abuttingly engage the upper end portion of the bore containing the piston control valve 7 to limit the upward movement thereof. A spring encompassing the stem portion 70 is adapted to have its lower end portion abuttingly engage the upper surface portion of upper follower disc 68 to bias the piston control valve 7 downwardly as viewed in FIG. 2. The lower follower disc 69 has a downwardly extending valve stem 71, which valve stem 71 has an annular sealing bead 72 on its lower end portion. Downward movement of the stem 71 moves stem 71 into engagement with diaphragm 51, as well as urges diaphragm 51 into abutting contact with a sealing bead 73 on a spring biased check valve 74. Valve stem 71 has a bore 75 extending upwardly from the lowermost end portion, which bore 75 communicates via radially extending ports 76, and an annular groove 77 on valve stem 71 with an exhaust port 78. Diaphragm 67 and follower discs 68 and 69 are subject on one side to the pressure of chamber 34, previously described, and subject on the other side to the pressure of balancing chamber 79, which chamber 79 is connected via a passageway 80 to the balancing chamber 39 and via a passageway 81 to the chamber 82 on the upper side of diaphragm 51. Chamber 82 is connected via a passageway 83 to chamber 54, the chamber below diaphragm 50.

Check valve 74 is slidably mounted in a stepped bore 84 located in the lower end portion of sectionalized casing 2, as viewed in FIG. 2. Check valve 74 has an intermediately located annular valve member 85 adapted to abuttingly engage a valve seat 86 through the biasing action of a spring 87 located in the lower end portion of bore 84. Downward displacement of the check valve 74 by the downward movement of valve stem 71, in a manner to be described, operates to connect pressurized reservoir 10 via passageway 88 to chamber 36, as well as to latch means 8, as well as to charge the balancing chambers 39 and 79 via check valve 38, branch passageway 37 and a restricted opening 89. A timing volume 9 is connected via passageway 90 to the balancing chambers 79 and 39 to avoid the necessity of an impractically small size choke or restricted opening 89.

In the operation of the double-acting relay valve device 1, assume that the brake pipe section 3 is connected to the locomotive and that the brake pipe section 4 is connected to the caboose. Pressurized fluid from the locomotive will enter pressure chamber 26 via brake pipe section 3 and will cause the diaphragm 11, follower 13, stems 15 and 16 to move rightward as viewed in FIG. 2 until the follower 13 engages the casing. Pressurized fluid from chamber 26 flows via passageway 27, chamber 23 and passageway 33 to control chamber 34, and moves control valve 7 downwardly as viewed in FIG. 2. Such downward movement of control valve 7 operates to move valve stem 71 downwardly along with the diaphragm 51 and check valve 74. Downward movement of check valve 74 operates to unseat annular valve means 85 from the valve seat 86 and thereby opens communication between the fluid pressure reservoir 10 and the chamber 36 for pressurization thereof. Pressurized fluid from chamber 36 pressurizes the brake pipe section 4 on the rear portion of the train via passageway 35, annular groove 21, passageway 31 and chamber 30. In addition, pressurized fluid from chamber 36 pressurizes chamber 65 as well as chamber 41 of latch means 8. Pressurization of chamber 65 via passageways 66 and 35 from chamber 36 moves piston control valve 6 downwardly such that the sealing bead 64 engages diaphragm 50 to move such diaphragm 50 into sealing engagement with annular sealing bead 56 to thereby close off communication between chambers 54 and 55 and atmosphere. Pressurization of chamber 41 via passageway 35, annular groove 21 and passageway 40 moves valve stem 47 of latch means 8 downwardly such that the lower end portion thereof engages the notch 19 to thereby lock the valve stems 15 and 16 in their newly registered positions. On such downward movement of stem 47 an annular groove 91 on the intermediate portion of the valve stem 47 interconnects passageway 58 with a passageway 92, such that pressurized fluid from the brake pipe section 3 on the forward portion of the train is communicated via chamber 23, passageway 92, annular groove 91, passageway 58 to chamber 55. In addition, balancing chambers 39 and 79 and timing reservoir 9 are pressurized from chamber 36 via passageway 37, past check valve 38, restricted opening 89 and passageway 80.

With the control chambers 65 and 34 pressurized from the brake pipe sections 4 and 3 respectively, as well as balancing chambers 39 and 79, the relay valve device 1 is conditioned for propagating a braking application, as well as conditioned for correcting any leakage in the rear half portion of the brake pipe of a train to reduce the pressure gradient to thereby improve the brake responses of a train and to facilitate increasing the length of a train.

With the relay valve device 1 conditioned as set forth above, a service rate of brake pipe reduction in the front end portion of the train registers a predetermined rate of reduction in pressure in brake pipe section 3 and in chamber 26 such as to register a similar brake pipe reduction in control chamber 34 via passageway 27, chamber 26 and passageway 33. Such a brake pipe reduction in control chamber 34 moves piston control valve 7 upwardly since the pressure in balancing chamber 79 is greater than the pressure in control chamber 34. Such upward movement of valve 7 carries valve stem 71 upwardly therewith and moves valve stem 71 upwardly away from diaphragm 51 and thereby communicates chambers 82 and 36 with atmosphere via bore 75, radial grooves 76 and exhaust port 78 to thereby initiate a reduction in pressure in chamber 82. Chambers 82 and 36 are connected to the brake pipe section 4 to thereby effect a brake pipe reduction in the rear portion of the train corresponding to the service rate of brake pipe reduction in the forward portion of the train. Communication is established between chambers 82 and 36 and brake pipe section 4 via passageway 35, annular groove 21 and passageway 31. It is to be noted balancing chamber 79 is connected to chambers 82 and 31 via passageway 81. Upon sufficient reduction of pressure in the rear brake pipe section 4, which will be substantially equal to the brake pipe reduction in the forward portion of the train, which pressure reduction is registered in the balancing chamber 79, piston control valve 7 moves downwardly into a lap position wherein valve stem 71 abuttingly engages diaphragm 51 to interrupt the flow of pressurized fluid to atmosphere via port 75 from chambers 79, 82 and 36 and the rear brake pipe section 4. Thus, a brake pipe reduction effected from the front end of the train will reduce the brake pipe pressure at an equal rate on the rear portion of the train to effect similar braking action, which braking action is well known and understood in the art.

With the relay valve device 1 conditioned as set forth above, a service rate of brake pipe reduction effected in the rear end portion of the train will take effect in the brake pipe section 4 and register a similar reduction of pressure in pressure control chamber 65 via passageway 31, annular groove 21, passageway 35 and branch passageway 66. Such reduction of pressure in chamber 65 causes piston control valve 6 to move upwardly and unseats annular sealing bead 64 from the diaphragm 50 to open communication between chambers 55 and 54 and atmosphere via vent opening 57. With chambers 54 and 55 connected to atmosphere, a service rate of brake pipe reduction will also be effected in brake pipe section 3 in the forward portion of the train. Brake pipe section 3 is vented to atmosphere via passageway 27, chamber 23, passageway 92, annular groove 91 in stem 47, passageway 58, chamber 55, bore 52 and vent opening 57. Piston control valve 6 will move downwardly into a lap position to interrupt such reduction in pressure upon sufficient venting of pressurized fluid from balancing chambers 39 and 79 and timing reservoir 9, which venting is via passageway 81, passageway 83 chamber 54 and vent opening 57.

An emergency brake pipe reduction in either the front end section or the rear end section of the train effects a corresponding emergency brake pipe reduction in the rear end section or the front end section of the train respectively in a manner similar to the service brake pipe reduction as described above, except that the rate of reductions are different, however, the manner of operation is similar.

In the event that an emergency brake pipe reduction has been effected in addition to the respective brake pipe sections 3 and 4 being vented, the chambers connected with these brake pipe sections are similarly vented. One chamber so vented is chamber 41 of latch means 8 which, in cooperation with the biasing action of spring acting on the underside of follower discs 43 and 44, moves such discs and stem 47 upwardly as viewed in FIG. 2. Such action disengages the lowermost end portion of valve stem 47 from V-notch 19, to thereby unlock portion 15 and pilot valve 5.

Pilot valve 5 (stem portions 15 and 16 and followers 13 and 14) may remain in its unlatched position due to friction of the sealing rings on the stem portions 15 and 16 against the wall of their common bore in which they reciprocate. Upon a subsequent pressurization of brake pipe section 4, stem portions 15 and 16 will move leftward as viewed in FIG. 2, however, in the event brake pipe section 3 is subsequently pressurized following such emergency brake pipe reduction, stem portions 15 and 16 remain positioned in the rightward position as discussed above.

Upon such subsequent pressurization of brake pipe section 3 as discussed above from the locomotive end of the train, chamber 26 is initially pressurized by such brake pipe fluid pressure, while chambers 30 and 41 are pressurized by fluid pressure from the fluid reservoir 10 as discussed fully above, wherein the fluid pressure in chamber 41 moves the latch means 8 into the latching position in which the lowermost end portion of valve stem 47 engages V-notch 19. This action, however, is delayed until a given pressure of fluid is established in the brake pipe to overcome the force of the spring in chamber 48, which spring is equivalent to at least 10 p.s.i. or more in chamber 41. This degree of fluid pressure in chamber 41 will assure sufficient fluid pressure has been established in the brake pipe sections to assure positive positioning of pilot valve 5.

When the brake pipe reduction effected on the rear section of the train or the front section of the train has ceased and the brakes are to be released, restoration of the pressure in the respective brake pipe sections 3 and 4 is effected by pressurizing the brake pipe from the locomotive. Such pressurized fluid will enter brake pipe section 3 as well as chamber 26 to pressurize chamber 34 and move piston control valve 7 downwardly to unseat valve member 85 and interconnect the fluid pressure reservoir 10 to the chamber 36 in a manner described above. The pressurization of chamber 36 operates to restore the pressure in the brake pipe section 4 on the rear end portion of the train. Brake pipe section 4 is connected to chamber 36 via passageway 35, annular groove 21, conduit 31 and chamber 30. Upon sufficient pressurization of the brake pipe section 4 and chamber 36, pressurized fluid will flow via passageway 35, branch passageway 37, restricted opening 89, passageway 80 to balancing chamber 79 and thereby move valve stem 71 upwardly to its lap position wherein annular valve means 85 is seated on valve seat 86 and the lower end portion of valve stem 71 abuttingly engages diaphragm 51. Diaphragm 51 engages check valve 74 to seal communication between chambers 36 and 82 and atmosphere.

Assuming that the stem portions 15 and 16 are still in their rightward-most position and that the brake pipe section 3 is connected to the locomotive, any leakage of brake pipe pressure on the rear brake pipe section 4 will be reflected in chamber 79. Chamber 79 is below diaphragm 67 of piston control valve 7 and connected to the brake pipe section 4 on the rear portion of the train via chamber 30, passageway 31, annular groove 21, passageway 35, branch passageway 37, restricted opening 89 and passageway 80. The differential in pressure between chambers 79 and 34 causes piston control valve 7 to move downwardly and unseat annular valve means 85 to interconnect fluid pressure reservoir 10 with chamber 36 for pressurization thereof. Pressurization of chamber 36 causes the pressurization of brake pipe section 4 via passageway 35, annular groove 21, passageway 31 and chamber 30. In addition, pressurized fluid from chamber 36 flows via passageway 35, restricted opening 89 and passageway 80 to pressurize chamber 79, and upon sufficient pressurization thereof balances the pressure in chamber 34 to thereby move piston control valve 7 to a lap position wherein the pressures in the brake pipe section on the rear portion of the train is equal to the pressure in the brake pipe section in the forward portion of the train.

Thus, it is observed that any brake pipe leakage in the rear half of the train registers such leakage in the double-acting relay valve device 1 to cause replenishment thereof and thereby maintains the brake pipe pressure substantially constant throughout the train.

It is to be noted that with the provision of the spring on stem 70 of piston control valve 7, and with the effective area of follower disc 68 being greater than disc 69, a higher pressure is necessary in chamber 79 to balance the pressure in chamber 34. The pressure in balancing chamber 79 necessary to overcome the fluid pressure in chamber 34 and the spring may be adjusted by the proper selection of the spring and, if desired, the spring may be omitted. With a higher pressure required in chamber 79 than chamber 34, a slightly higher charge at the front end of the rear half of the train is obtained. Since the diaphragm 67 and followers 68 and 69 are in balance when charged, the spring on stem 70 will not effect its sensitivity when a reduction is made at the head end of the train, but owing to the slightly higher rear end brake pipe pressure, somewhat higher brake cylinder pressure will be realized rearwardly of the center of the train, thus helping to minimize run-in of slack and the resulting shocks. Since no air supply is available on a rear end caboose, no brake release may be initiated from the rear end of the train. Release from the front end may, however, be initiated wherever desired, and recharging of both the front brake pipe section and rear brake pipe section will be carried out as discussed above.

Assuming that instead of connecting brake pipe section 3 to the locomotive, that brake pipe section 4 is connected to the locomotive and that the brake pipe section 3 is connected to the caboose. Pressurized fluid from the locomotive will enter pressure chamber 30 via brake pipe section 4 and will cause the diaphragm 12, follower 14, stems 15 and 16 to move leftward as viewed in FIG. 2 until the follower 14 engages the casing. Pressurized fluid from chamber 30 will flow via passageway 31, annular groove 17, passageway 33 to control chamber 34 and move control valve 7 downwardly as viewed in FIG. 2. Such downward movement of control valve 7 operates to move valve stem 71 downwardly along with diaphragm 51 and check valve 74. The downward movement of check valve 74 operates to unseat annular valve means 85 from the valve seat 86 and thereby opens communication between the fluid pressure reservoir 10 and the chamber 36 for pressurization thereof. Pressurized fluid from chamber 36 pressurized the brake pipe section 3, which is now the rear brake pipe section on the train, via passageway 35, chamber 23, passageway 27, and chamber 26. In addition, pressurized fluid from chamber 36 pressurizes chamber 65 as well as chamber 41 of latch means 8. Pressurization of chamber 65 via passageways 35 and 66 from chamber 36 moves piston control valve 6 downwardly such that the sealing bead 64 engages diaphragm 50 to move such diaphragm 50 into sealing engagement with annular sealing bead 56 to thereby close off communications between chambers 54 and 55 and atmosphere. Pressurization of chamber 41 via passageway 35, chamber 23 and passageway 40 moves valve stem 46 of latch means 8 downwardly such that the lower end portion thereof engages the notch 20 to thereby lock the valve stems 15 and 16 in their newly registered positions. On such downward movement of stem 46 and annular groove 91 on the intermediate portion of valve stem 47 interconnects passageway 58 with the passageway 92, such that pressurized fluid from the brake pipe section 4 flows via chamber 30, passageways 31 and 32, annular groove 17, passageway 92, annular groove 91, passageway 58 to chamber 55. In addition, balancing chambers 39 and 79 and timing reservoir 9 are pressurized from chamber 36 via passageway 37, past check valve 38, restricted opening 89 and passageway 80.

With the control chambers 65 and 34 pressurized from the brake pipe sections 3 and 4 respectively, as well as balancing chambers 39 and 79, the relay valve device 1 is conditioned for propagating a braking application as well as conditioned for correcting any leakage in the rear brake pipe section of a train to reduce the pressure gradient to thereby improve the brake responses of a train and to facilitate the increasing of the length of a train.

With the relay valve device 1 conditioned as set forth above, a service rate of brake pipe reduction initiated in the front end portion of a train registers a predetermined rate of reduction in pressure in brake pipe section 4 and in chamber 30 such as to register a similar brake pipe reduction in control chamber 34 via passageways 31 and 32, annular groove 17 and passageway 33. Such a brake pipe reduction in control chamber 34 moves piston control valve 7 upwardly since the pressure in balancing chamber 79 is greater than the pressure in control chamber 34. Such upward movement of valve 7 carries valve stem 71 upwardly therewith and moves valve stem 71 upwardly away from diaphragm 51 and thereby communicates chambers 82 and 36 with atmosphere via bore 75, radial groove 76 and exhaust port 78 to thereby initiate a reduction in pressure in chamber 82. Chamber 82 and chamber 36 are connected to the brake pipe section 3, the brake pipe section in the rear portion of the train, to thereby effect a brake pipe reduction in the rear portion of the train similar to the service rate of brake pipe reduction in the forward portion of the train. Communication is established between chambers 82 and 36 and the brake pipe 3 via passageway 35, chamber 23 and passageway 27. It is to be noted balancing chamber 79 is connected to chambers 82 and 36 via passageway 81. Upon sufficient reduction of pressure in the rear brake pipe section 3 which will be substantially equal to the brake pipe reduction in the forward portion of the train, which pressure reduction is registered in the balancing chamber 79, piston control valve 7 moves downwardly into a lap position wherein valve stem 71 abuttingly engages diaphragm 51 to interrupt the flow of pressurized fluid to atmosphere via bore 75 from chamber 79, chamber 82, chamber 36 and the rear brake pipe section. Thus, if brake pipe reduction is effected from the front end of the train, it will reduce the brake pipe pressure at an equal rate on the rear portion of the train to effect similar braking action as is well known and understood in the art.

A service rate of brake pipe reduction effected in the rear end portion of the train will take effect in the brake pipe section 3 and register a similar reduction of pressure in pressure control chamber 65 via passageway 27, chamber 23, passageway 35 and branch passageway 66. Such reduction of pressure in chamber 65 causes piston control valve 6 to move upwardly and unseat annular sealing bead 64 from diaphragm 50 to open communication between chambers 55 and 54 and atmosphere via vent opening 57. With chambers 54 and 55 connected to atmosphere, a service rate of brake pipe reduction will also be effected in brake pipe section 4 in the forward portion of the train. Brake pipe section 4 is vented to atmosphere via passageway 31, annular groove 17, passageway 92, annular groove 91 in stem 47, passageway 58, chamber 55, bore 52 and vent opening 57. Piston control valve 6 will move downwardly into a lap position to interrupt such reduction in pressure upon sufficient venting of pressurized fluid from balancing chambers 39 and 79 and timing reservoir 9, which venting is from chambers 79 and 82 via passageway 81, passageway 83, chamber 54 and vent opening 57.

Emergency brake pipe reduction in either the front end portion or the rear end portion of the train effects a corresponding brake pipe reduction in the rear end portion or the front end portion of the train respectively in a manner similar to the service brake pipe reduction as described above, except that the rate of reductions are different, however, the manner of operation is similar.

When the brake pipe reduction effected on the rear portion of the train or front portion of the train has ceased and the brakes are to be released, restoration of the pressure in the respective brake pipe sections 3 and 4 is effected by pressurizing the brake pipe from the locomotive. Such pressurized fluid will enter brake pipe section 4 as well as chamber 30 to pressurize chamber 34 and move piston control valve 7 downwardly to unseat valve member 85 and interconnect the fluid pressure reservoir 10 to the chamber 36 in a manner described above. The pressurization of chamber 36 operates to restore the pressure in the brake pipe section 3 in the rear portion of the train, in a manner described above. As explained above, the respective control valve 6 and 7 will be moved to their lapped positions.

Assuming that the stem portions 15 and 16 are still in their forwardmost positions and that the brake pipe section 4 is connected to the locomotive, any leakage of brake pipe pressure on the rear portion of the train will be reflected in chamber 79. Chamber 79 is below diaphragm 67 of piston control valve 7 and connected to the brake pipe section 3, the rear portion of the train, via chamber 26, passageway 27, chamber 23, passageway 35, branch passageway 37, restricted opening 89 and passageway 80. The differential in pressure between chambers 79 and 34 causes piston control valve 7 to move downwardly and unseat annular valve means 85 to interconnect fluid pressure reservoir 10 with chamber 36 for pressurization thereof. Pressurization of chamber 36 causes the pressurization of brake pipe section 3 via passageway 35, chamber 23, passageway 27 and chamber 26. In addition, pressurized fluid from chamber 36 flows via passageway 35, restricted opening 89 and passageway 80 to pressurize chamber 79, and upon sufficient pressurization thereof balances the pressure in chamber 34 to thereby move piston control valve 7 to a lapped position wherein the pressures move piston control valve 7 to a lapped position wherein the pressures in the brake pipe section on the rear portion of the train are equal to the pressure in the brake pipe section in the forward portion of the train. Thus, it is observed that any brake pipe leakage in the rear half of the train registers such leakage in the double-acting relay valve device 1 to cause replenishment thereof and thereby maintains the brake pipe pressure substantially constant throughout the train subject to gradient as explained above.

Obviously, many modifications and variations of the present invention are possible in the light of the above teachings. It is therefore to be understood that within the scope of the appended claims, the invention may be practiced otherwise than as specifically described.

Having now described the invention, what I claim as new and desire to secure by Letters Patent, is:

1. A fluid pressure relay valve device for interposition between two sections of a brake pipe on a train of cars, said relay valve device comprising:
 (a) pilot valve means positionable in one or the other of two different operating positions depending upon the section of brake pipe first charged with fluid pressure, and
 (b) self-lapping valve means cooperative with said pilot valve means in its said one position and operatively responsive to an increase or decrease of fluid pressure in the one section of the brake pipe to effect a corresponding increase or decrease of fluid pressure in the other section of the brake pipe.

2. A fluid pressure relay valve device as set forth in claim 1 wherein:
 (a) said self-lapping valve means is responsive to a reduction of fluid pressure in the other section of the brake pipe relative to the pressure maintained in the one section of brake pipe to maintain the pressure in the other section of the brake pipe at a level corresponding to that in the one section.

3. A fluid pressure relay valve device as claimed in claim 2, further characterized by:

(a) fluid pressure operated locking means effective when said pilot valve means is actuated to its said one position to lock said pilot valve means in its said one position and when said pilot valve means is actuated to its said second position to lock said pilot valve means in its said second position, and (b) means for restoring said locking means to a position in which said pilot valve means is unlocked for movement whenever the pressure in the brake pipe is reduced substantially to zero.

4. A fluid pressure relay valve device for interposition between two sections of a brake pipe on a train of cars, said relay valve device comprising:

(a) pilot valve means positionable in one or the other of two different operating positions depending upon the section of the brake pipe first charged with fluid pressure, and (b) self-lapping valve means conditioned by said pilot valve means in one of said two positions to provide controlled variations in fluid pressure in the other section of the brake pipe in response to controlled variations in fluid pressure in the one section and said self-lapping valve means conditioned by said pilot valve means in the other of said two positions to provide controlled variations in fluid pressure in the one section of the brake pipe in response to controlled variations in fluid pressure in the other section of the brake pipe.

5. A control device for regulating and controlling the propagation of fluid pressure between two pipes comprising:

(a) a pair of spaced chambers adapted to be connected respectively to said pipes, (b) control means operatively connected to said pair of chambers, (c) a fluid reservoir means, (d) said control means responsive to pressurization of either one of said pair of chambers to a maximum pressure from an independent source for connecting said fluid reservoir means to the other of said pair of chambers for pressurization thereof to such maximum pressure, and (e) said control means responsive to an initial reduction in pressure in either one of said chambers for effecting a corresponding pressure reduction in the other of said chambers.

6. A control device as set forth in claim 5 wherein:

(a) said control means has means for adjusting the maximum pressure in one of said chambers different to the maximum pressure in the other of said chambers.

7. A control device for regulating and controlling the propagation of fluid pressure between two pipes comprising:

(a) a pair of spaced chambers adapted to be connected respectively to such pipes, (b) control means operatively connected to said pair of chambers, (c) a fluid reservoir means, (d) said control means responsive to pressurization of either one of said pair of chambers to a maximum pressure from an independent source for connecting said fluid reservoir means to the other of said pair of chambers for pressurization thereof of such maximum pressure, (e) said control means responsive to a predetermined rate of reduction in pressure in either one of said chambers for effecting a corresponding rate of reduction in pressure in the other of said chambers, (f) said control means having means for adjusting the maximum pressure in said other chamber, and (g) said control means being responsive to a reduction in pressure in said other chamber at a rate less than said predetermined rate to connect said fluid reservoir means to said other chamber to charge said other chamber to said maximum pressure.

8. In a fluid pressure braking system for use on a brake pipe of a train, the combination comprising:

(a) a pair of spaced conduits wherein either one of said conduits is adapted to be connected to the brake pipe section of the forward portion of such a train and the other one of said conduits is adapted to be connected to the brake pipe section on the rear portion of such a train, (b) pressure responsive control valve means connected to said pair of conduits, and (c) said pressure responsive control means being operably responsive to a change in pressure in said either one of said pair of conduits for effecting a corresponding change in pressure in said other one of said conduits to thereby effect a change of pressure in the brake pipe section of the rearward portion of a train corresponding to that initiated in the brake pipe section of the forward portion of the train.

9. A brake pipe control system for use on a train of cars, said system comprising:

(a) a pair of brake pipe sections wherein one of said sections is adapted to be connected to the locomotive of a train to be charged normally at a given level of pressure, (b) said train having another brake pipe section, (c) said one brake pipe section and said other brake pipe section of the train extending in opposite directions from said intermediate car, (d) control means on such intermediate car operatively connected to said pair of brake pipe sections, (e) said control means having a pilot valve movable selectively into a first position or a second position in response to connecting said one brake pipe section or said other brake pipe section to such locomotive of a train, (f) a fluid reservoir means, (g) said pilot valve in said first position cooperative with said control means to connect said reservoir means to said other brake pipe section for charging thereof to a second given level of pressure, and said pilot valve in said second position cooperative with said control means to connect said reservoir means to said one brake pipe section to charge said one brake pipe section to said second given level of pressure, (h) latch means cooperative with said pilot valve in said first or second position and cooperative with said reservoir means for latching said control means in said first or said second position, and (i) said control means responsive to a reduction in pressure in either one of said pair of brake pipe sections for effecting a corresponding reduction in pressure in the remaining one of said brake pipe sections not so reduced.

10. A train brake control system including:

(a) a pair of brake pipe sections wherein either one of said brake pipe sections is selectively connected to the locomotive subject to being selectively charged normally at a given level of pressure while the other of said pair of brake pipe sections is operatively connected to the caboose, (b) a pilot valve operatively connected to said pair of brake pipe sections wherein said pilot valve is movable to a first or second position, (c) said one brake pipe section and said other brake pipe section extending in opposite directions from said intermediate car, (d) a fluid pressure reservoir, (e) a first differential control valve means having a pressure control chamber and a first balancing chamber, (f) said pilot valve movable to said first position upon initial pressurization of said one brake pipe section from such locomotive, and movable to said second position upon initial pressurization of said other brake pipe section from such locomotive, (g) said pilot valve in said first position operatively connects a first passageway to said other brake pipe section and said one brake pipe section to said control chamber for pressurization of said control chamber and actuation of said first control valve means, (h) said first control valve means in said actuated position being operative to connect said fluid pressure reservoir to said first passageway for pressurization thereof, (i) said first passageway connected via throttle means to said balancing chamber for pressurization thereof to move said first control valve means to close off communication between said fluid pressure reservoir source and said first passageway, (j) latch means normally biased into an inoperative position, and (k) said pilot valve in said first position communicating said first passageway with said latch means to thereby move said latch means into operative position for locking said pilot valve in said first position.

11. A brake pipe control system as set forth in claim 10 wherein:
(a) said first differential control valve means is responsive to a predetermined brake pipe reduction in said one brake pipe section for effecting a corresponding brake pipe reduction in said other brake pipe section.

12. A brake pipe control system as set forth in claim 10 wherein:
(a) said first differential control valve means has means for adjusting the pressure developed in said balancing chamber to balance the pressure in said pressure control chamber for moving said first control valve means to deactuated position to thereby interrupt the flow of pressurized fluid from said fluid pressure reservoir.

13. A brake pipe control system as set forth in claim 12 wherein:
(a) said pilot valve in said second position operatively connects said other brake pipe section to said control chamber for pressurization thereof and actuating said first control valve means, and
(b) said pilot valve in said second position communicating said first passageway to said one brake pipe section for pressurization thereof.

14. A brake pipe control system as set forth in claim 11 wherein:
(a) said first differential control valve means is responsive to a reduction in pressure in said other brake pipe section at a rate less than said predetermined brake pipe reduction in said one brake pipe section for actuation thereof to connect said fluid pressure reservoir to said balancing chamber and said other brake pipe section to supplement such drop in fluid pressure thereof.

15. A brake pipe control system as set forth in claim 11 wherein:
(a) a second differential control valve means has a fluid chamber and a second balancing chamber,
(b) said second balancing chamber communicating directly with said first balancing chamber,
(c) said fluid chamber being connected to said one brake pipe section by said pilot valve in said second position and being connected to said other brake pipe section by said pilot valve in said first position, and
(d) said second control valve means responsive to predetermined brake pipe reduction in said fluid chamber for venting pressurized fluid from said pressure control chamber and such brake pipes connected thereto.

16. A brake pipe control system comprising:
(a) a pair of brake pipe sections wherein either one of said brake pipe sections is operatively connected to the locomotive of such a train subject to being selectively maintained at a given level of pressure while the other of said pair of brake pipe sections is operatively connected to the caboose,
(b) a pilot valve operatively connected to said pair of brake pipe sections wherein said pilot valve is movable to a first or second position,
(c) said one brake pipe section and said other brake pipe section of the train extend in opposite directions from said intermediate car,
(d) a fluid pressure reservoir,
(e) a reservoir control chamber,
(f) a normally seated valve member located in said reservoir control chamber and said valve member operative upon actuation to connect said reservoir to said reservoir control chamber and operative upon deactuation to close off communication between said reservoir and said reservoir control chamber,
(g) said reservoir control chamber communicating with a first passageway,
(h) a first and second control valve means,
(i) said first and said second control valve means each having a pressure control chamber and a balancing chamber,
(j) said first control valve means operative upon actuation to actuate said valve member,
(k) said balancing chambers being interconnected,
(l) said pilot valve in said first position connecting said pressure chamber of said first control valve means to said one brake pipe section for actuation of said first control valve and said valve member to thereby connect said first passageway to said other brake pipe section,
(m) said first passageway being connected to said pressure chamber of said second control valve means and being connected via restricted openings to said balancing chambers for balancing said first and second valve means into neutral deactuated positions whereby said valve member is deactuated to close off comunications between said fluid pressure reservoir and said reservoir control chamber,
(n) said first control valve means responsive to a greater pressure in said associated pressure chamber over said associated balancing chamber for actuation of said first control valve means to actuate and unseat said normally seated valve member for connecting said fluid pressure reservoir source to said one passageway for charging said other brake pipe, and returning said first control valve means to neutral deactuated position upon sufficient pressurization of said balancing chambers via said first passageway,
(o) said first control valve means responsive to a pressure reduction in said pressure chamber associated therewith over said balancing chamber associated therewith to vent said balancing chambers and said other brake pipe section, and
(p) latch means operative to lock said pilot valve in said first or second position upon pressurization of said first passageway.

17. A brake pipe control system as set forth in claim 16 wherein:
(a) said second control valve means is responsive to a predetermined pressure drop in said other brake pipe section to vent said one brake pipe section.

18. A brake pipe control system as set forth in claim 17 wherein:
(a) said first control valve means has means for adjusting the pressure in said other brake pipe section relative to the pressure in said one brake pipe section.

19. A brake pipe control device for regulating and controlling the propagation of pressure between a pair of unconnected brake pipe sections comprising:
(a) a pair of unconnected brake pipe sections, respectively, wherein one of said brake pipe sections is adapted to be connected to a locomotive through one section of a train and the other of said brake pipe sections is adapted to be connected to a caboose through the remaining section of the train, and vice versa, (b) a control device operatively interposed between said pair of brake pipe sections, (c) said control device having control means responsive to a reduction in pressure in either of said brake pipe sections for effecting a corresponding reduction in pressure in the other brake pipe section independently of the brake pipe section so initially reduced in pressure, and (d) said control device having other means responsive to charging of either of said brake pipe sections by a charging means following reduction of pressure in both of said brake pipe sections for effecting a corresponding charging of the uncharged brake pipe section solely by another charging means.

20. A control device for regulating and controlling the propagation of pressure between two unconnected brake pipe sections comprising:

(a) a pair of oppositely extending unconnected brake pipe sections, (b) a control device operatively connected to said pair of brake pipe sections, (c) a fluid reservoir means, (d) said control device having means responsive to charging of either of said pair of brake pipe sections for connecting said fluid reservoir means to the other of said pair of brake pipe sections for charging thereof, (e) said control device having other means responsive to a service rate of reduction in pressure in either of said brake pipe sections for effecting a corresponding reduction in the other of said brake pipe section independently of the brake pipe section so initially reduced, and (f) said first-mentioned means in said control device being responsive to pressurization of either one of said pair of brake pipe sections following said service rate of pressure reduction for connecting said fluid reservoir means to said brake pipe section not so pressurized as the sole means for pressurization thereof.

21. A brake pipe control system for use on a long train comprising:

(a) a first brake pipe section adapted to be connected to the forward portion of a train and a second brake pipe section disconnected from said first brake pipe section and adapted to be connected to the rearward portion of a train, and vice versa, (b) a control device operatively connected to said first and second brake pipe sections for effecting pressure changes in either of said brake pipe sections in response to pressure changes in the other of said brake pipe sections, (c) said control device having control means responsive to a predetermined rate of pressure reduction in either one of said brake pipe sections for propagating such predetermined rate of pressure reduction in the other of said brake pipe sections independently of said brake pipe section so initially reduced, and (d) other means in said control device responsive to a pressure reduction in either one of said brake pipe sections at a rate less than said predetermined rate for thereby recharging said brake pipe section so reduced in pressure to the extent of the pressure loss.

22. A brake pipe control system as set forth in claim 21 wherein:

(a) said control device has an emergency control means responsive to a pressure reduction in either one of said brake pipe sections at a rate at least a certain amount greater than said predetermined rate of pressure reduction for thereby venting the other of said brake pipe sections independently of said brake pipe section so reduced in pressure and at said rate greater than said predetermined rate.

References Cited by the Examiner

UNITED STATES PATENTS

| | | | |
|---|---|---|---|
| 2,133,575 | 10/1938 | Rosenberg | 137—493.1 X |
| 3,173,483 | 3/1965 | Brandt et al. | 137—87 X |

EUGENE G. BOTZ, *Primary Examiner.*